Figure 1:
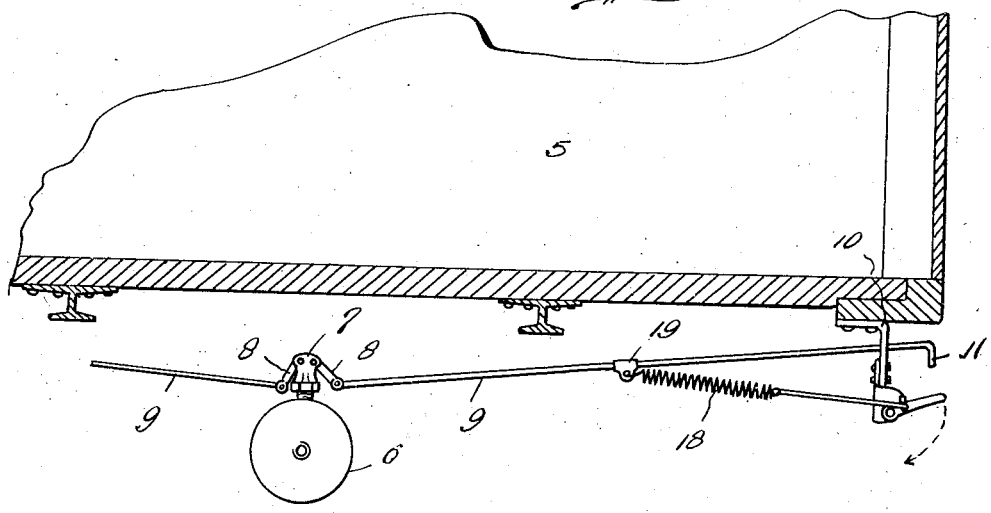

Aug. 9, 1927.

C. E. BLOSE 1,638,081

AUXILIARY BLEED VALVE ACTUATOR FOR AIR BRAKE EQUIPMENT

Filed Dec. 1 1926

Inventor

C. E. Blose,

By *Clarence A. O'Brien*
Attorney

Patented Aug. 9, 1927.

1,638,081

UNITED STATES PATENT OFFICE.

CLYDE E. BLOSE, OF SPRINGFIELD, OHIO.

AUXILIARY BLEED-VALVE ACTUATOR FOR AIR-BRAKE EQUIPMENT.

Application filed December 1, 1926. Serial No. 151,932.

This invention relates generally to air brake equipment for railway cars, and has more particular reference to an auxiliary bleed valve actuating device.

The primary object of the invention is to provide auxiliary bleeds wherein the bleed valve of the car associated air pressure tanks may be quickly moved to open position and there automatically maintained for overcoming the requirements of the brakeman manually holding the bleed valve open until the air has entirely discharged from the tank.

A further and important object is to provide an auxiliary device of this character that is so constructed as to be associated with a conventional air brake equipment without in any manner whatever altering the equipment.

A still further object is to provide a device of this character that is extremely simple of construction, inexpensive of manufacture, easy of installation, and one that may be readily installed in cars now in use equipped with conventional air brake mechanism.

With the foregoing and other objects in view which will become apparent as the nature of the invention is better understood, the same comprising the novel form, combination, and arrangement of parts hereinafter more fully described, shown in the accompanying drawing and claimed.

Figure 2:
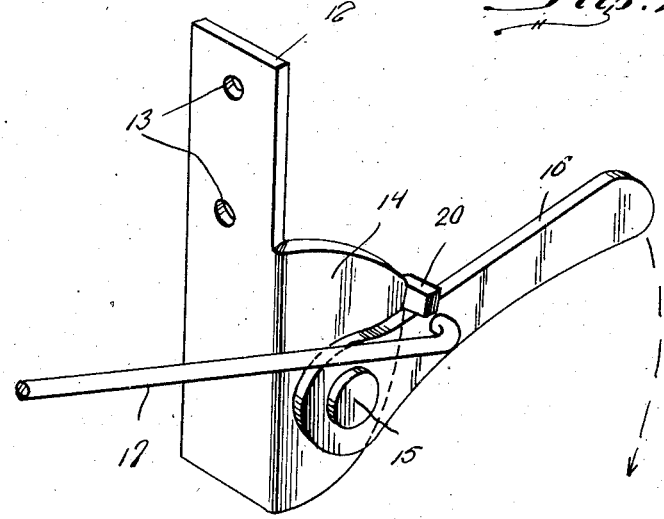

In the drawing wherein like reference characters indicate corresponding parts throughout both of the views:

Figure 1 is a transverse fragmentary section of a freight car body beneath which is disposed the usual compressed air tank of the air brake equipment, while associated with one of the usual bleed valve rods is an auxiliary bleed valve actuator constructed in accordance with the present invention, and Figure 2 is an enlarged perspective disclosing the major units of my auxiliary device.

Now having particular reference to the drawing, 5 designates a car body beneath which is disposed the usual compressed air tank 6 of an air brake equipment with which is associated a conventional type of bleed valve 7 that includes a pair of operating arms 8—8 from which are extended control rods 9—9 that extend toward opposite sides of the car body through suitable brackets, one of which is shown and designated 10, these brackets being suspended from the bottom of the car body and in slight spaced relation with the opposite sides thereof, the extreme end of each of these rods being turned at right angles so as to provide a handle 11.

My invention per se comprises a relatively elongated bracket plate 12 that is formed at one end with a pair of openings 13 so as to permit the plate to be secured in suspended relation to the bracket 10 through which the bleed valve control 9 passes. Beneath the supporting bracket 10 the plate 12 is formed at one edge with an outwardly projecting right angular ear 14 to which is pivotally secured as at 15 the inner end of the lever 16. Pivotally secured to this lever is one end of a short rod 17 that extends inwardly between the car body 5 and that is secured to the adjacent bleed valve control rod 9 through the medium of a retractile coil spring 18, which spring is connected at one end to the rod 17 and at its opposite end to a suitable clamp 19 that may be secured to the rod 9 at any predetermined point thereon.

Above the pivotal connection 15 the bracket ear 14 is formed with a laterally projecting stop lug 20 as shown more clearly in Figure 2 that limits the upward swinging movement of the lever 16 as clearly disclosed in both of the figures.

Obviously when the lever 16 is swung in an upward direction a pull is occasioned upon the rod 17, spring 18, and the bleed valve attached rod 9 for consequently opening the bleed valve so as to permit the air to drain from the pressure tank 6. When the lever 16 is moved into engagement with the lug 20, the rod 19 is off center with respect to the lever so that the spring 18 will tend to further move the lever 16 in an upward direction so as to lock the lever in bleed valve open position. However, by swinging the lever 16 downwardly in the direction of the arrows in Figures 1 and 2, the pull upon the bleed valve actuated rod 9 will be released so that the valve may automatically move to closed position.

In view of the foregoing description when considered in conjunction with the drawing it will at once be apparent that I have provided a highly novel, simple and efficient auxiliary bleed valve actuator for air brake equipment that is well adapted for all the purposes heretofore designated and even though I have herein shown and described the invention as consisting of certain detailed structural elements, it is nevertheless to be understood that minor changes may be made therein without affecting the spirit and scope of the appended claims.

Having thus described the invention, what I claim is:—

1. In an auxiliary bleed valve actuator for air brake equipment wherein a pull rod is connected at one end to the bleed valve, a lever pivoted to the equipment carrying car adjacent to the operating end of the pull rod, a spring connection between the lever and the pull rod whereby the pull rod will be actuated when the lever is swung in one direction and be released when the lever is swung in a reverse direction, and means cooperating with the spring connection for maintaining the lever in rod pulled position.

2. In an auxiliary bleed valve actuator for railway car air brake equipment wherein the latter includes a pull rod connected at one end to the bleed valve, and a bracket depending from the side of the car for supporting the outer free end of the pull rod, a plate like member secured at its upper end to the depending bracket, a lever pivoted on said plate like member, a relatively short rod secured at one end to said lever at a point adjacent its pivotal connection, a retractile coil spring connecting the other end of said last mentioned rod to the intermediate portion of the pull rod, whereby the pull rod will be actuated when the lever is swung in one direction and be released when the lever is swung in a reverse direction, and cooperating means between the plate like member and the rod for maintaining the lever in a rod pulled position.

3. In an auxiliary bleed valve actuator for railway car air brake equipment wherein a pull rod is connected at one end to the bleed valve and a support depends from the outer side of the railway car through which the outer end of the pull rod extends; a plate like bracket secured at its upper end to the depending support, a laterally disposed ear formed on the lower portion of the bracket, a lever pivotally secured on the lower portion of the ear, a relatively short rod connected at its outer end to said pivoted lever at a point adjacent its pivotal connection to the ear, a retractile coil spring connecting the inner end of the short rod to the intermediate portion of the pull rod whereby the pull rod will be actuated when the lever is swung in one direction, and be released when the lever is swung in a reverse direction, and means for maintaining the lever in rod pulled position.

4. In an auxiliary bleed valve actuator for railway car air brake equipment wherein a pull rod is connected at one end to the bleed valve and a support depends from the outer side of the railway car through which the outer end of the pull rod extends; a plate like bracket secured at its upper end to the depending support, a laterally disposed ear formed on the lower portion of the bracket, a lever pivotally secured on the lower portion of the ear, a relatively short rod connected at its outer end to said pivoted lever at a point adjacent its pivotal connection to the ear, a retractile coil spring connecting the inner end of the short rod to the intermediate portion of the pull rod whereby the pull rod will be actuated when the lever is swung in one direction, and be released when the lever is swung in a reverse direction, and means for maintaining the lever in rod pulled position, said means comprising a stop lug formed on the upper portion of the ear, said lug being disposed laterally and arranged in the path of movement of the lever.

In testimony whereof I affix my signature.

CLYDE E. BLOSE.